Figure 1:
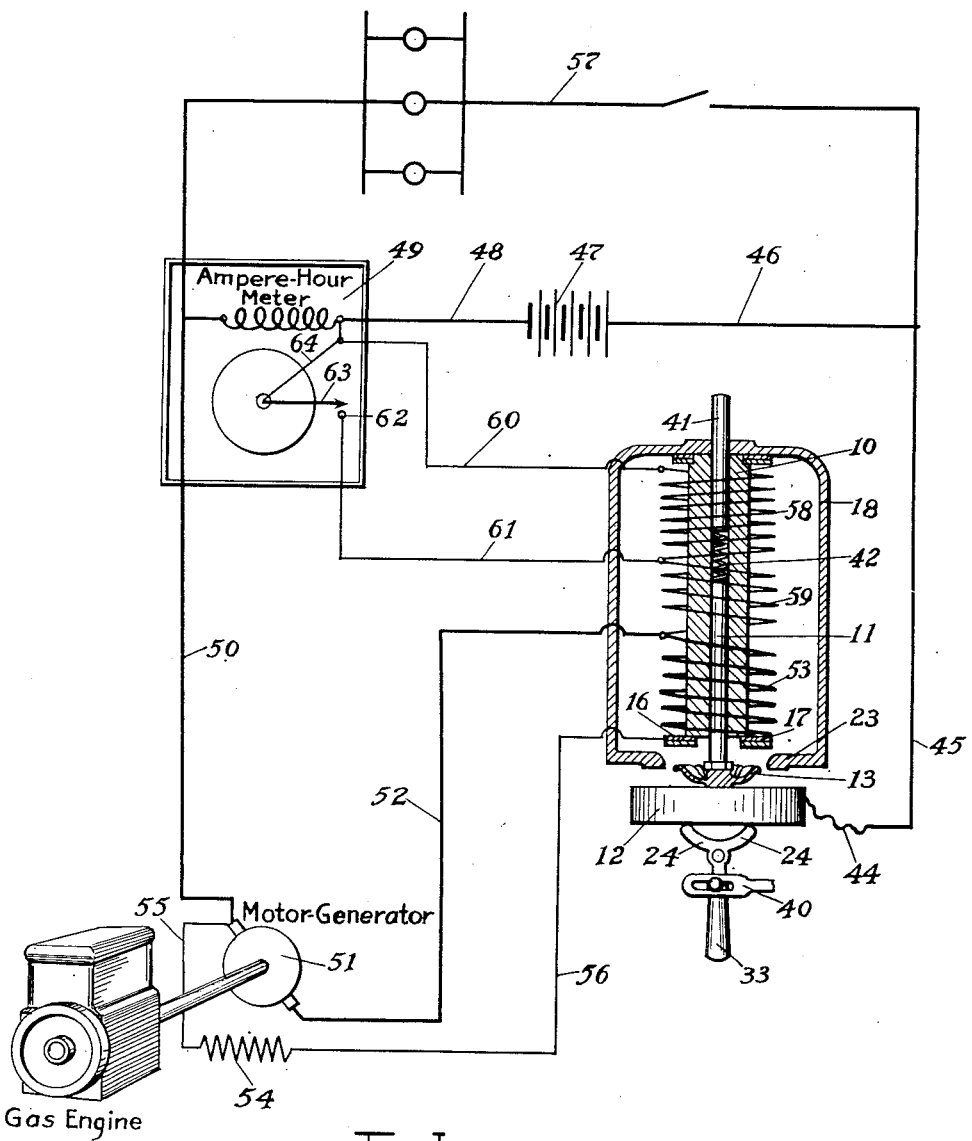

Nov. 3, 1925. 1,559,738
C. P. BROCKWAY
AUTOMATIC SWITCH
Filed June 21, 1919 2 Sheets-Sheet 1

INVENTOR.
Carl P. Brockway
BY Chester H. Braselton
ATTORNEY

Nov. 3, 1925.
C. P. BROCKWAY
AUTOMATIC SWITCH
Filed June 21, 1919
1,559,738
2 Sheets-Sheet 2
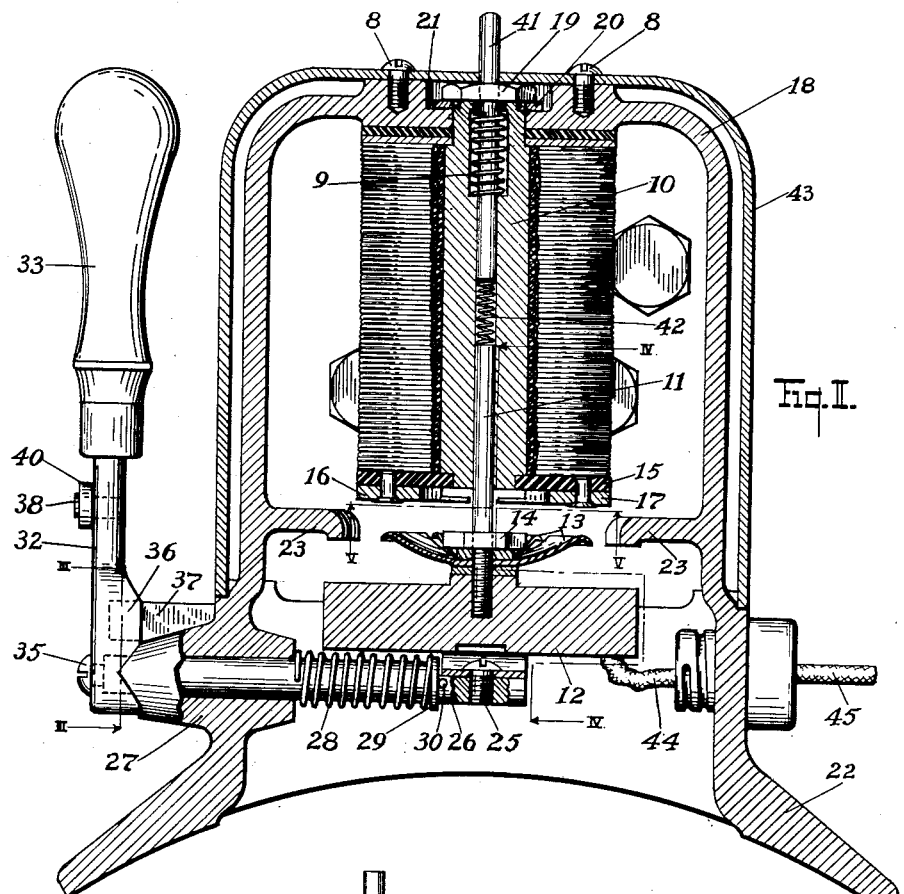
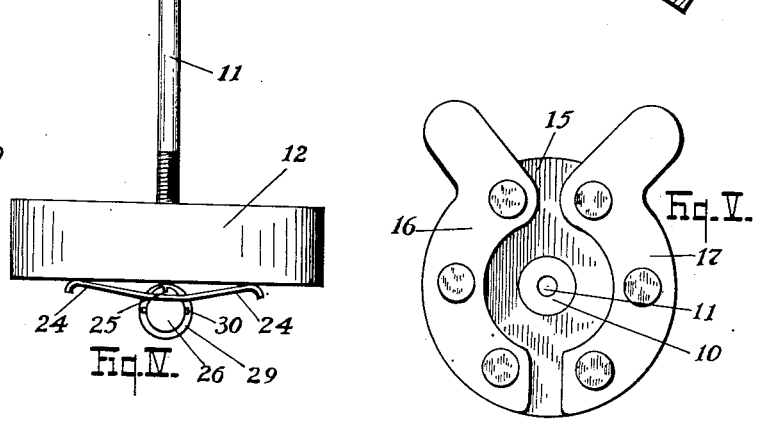
INVENTOR.
Carl P. Brockway
BY Chester H. Braselton
ATTORNEY Patented Nov. 3, 1925.

1,559,738

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

AUTOMATIC SWITCH.

Application filed June 21, 1919. Serial No. 305,924.

*To all whom it may concern:*

Be it known that I, CARL P. BROCKWAY, a citizen of the United States, residing at Toledo, in the county of Lucas and State of Ohio, have invented certain new and useful Improvements in Automatic Switches, of which I declare the following to be a full, clear, and exact description.

This invention relates to improvements in semi-automatic switches, and in electro-magnets for controlling the same.

One of the objects of the invention is the provision of means for closing the switch manually and for opening it automatically upon the occurrence of a predetermined condition in the electric circuit or circuits controlling the switch.

Another object of the invention is the provision of a lever which may be thrown in either direction from neutral to close the switch, and which automatically returns to neutral from either extreme position after being released by the operator.

A further object is the provision of a single stop for limiting the throw of the lever in either direction.

Still another object is the provision of means independent of the switch closing means for manually opening the switch against the action of the electro-magnet.

Other objects, and objects relating to details of construction and economies of manufacture, will appear as I proceed with the description of that embodiment of the invention, which, for the purposes of the present application, I have illustrated in the accompanying drawings, in which:

Figure I is a view, principally diagrammatic, showing an application of my invention.

Fig. II is a vertical, central, sectional view showing an electro-magnet and cooperating parts embodying my invention.

Fig. III is a detail view, partly in section on line III—III, Fig. II, of the operating lever of the invention.

Fig. IV is an elevational view taken on line IV—IV, Fig. II, showing the electro-magnet armature and the rock shaft and lifting fingers for raising the armature.

Fig. V is a bottom plan view of the electro-magnet showing the electric contacts carried thereby. The view is taken on the line V—V, Fig. II.

Similar reference characters refer to like parts throughout the views.

In the drawing, 10 indicates the core of an electro-magnet which is bored out axially for its entire length. Into the lower part of this bore there extends slidably a rod 11 attached at its base to an armature 12, preferably circular in shape and of considerable weight. Just above the armature, the rod 11 carries a series of resilient inter-connected electric contacts 13 of the shape known as "orange peel." The armature and the central portion of these contacts are firmly held together by means of a nut 14 threaded up on the rod 11.

Surrounding the lower end of the core 10 is a centrally perforated disc 15 of insulation, to the bottom of which is secured by rivets or otherwise, a pair of separated contact plates 16 and 17 adapted to be engaged by the resilient contacts 13, when the armature is raised. The core is supported from above upon an inverted bowl-shaped magnetic shell 18, which is provided with a central perforation through which the upper portion of the core 10 extends. The core is threaded upon its upper end to receive a nut 19 supported upon a washer 20 which is in turn supported upon the bottom of a recess 21 formed in the top of the shell 18. The base 22 of the shell is shaped to conform to the surface upon which the apparatus is to be mounted. The sides of the shell 18 have inwardly extending integral arms 23 which are engaged by the top of the armature 12, when the latter is raised. It will be noted that the contact 13 engages the contacts 16 and 17 before the armature engages arms 23 or the nut 14 engages the lower end of the core 10. The distance between core 10 and nut 14 is the same as that between arms 23 and armature 12.

When the armature 12 is in its lower position it rests upon fingers 24, which may be integral as shown in Fig. IV, and may be secured by any suitable fastening, as for instance a screw 25, to the flattened outer end of a rock shaft 26. The latter is rotatably supported in an enlarged portion 27 of the magnetic shell. A coil spring 28 surrounds the shaft 26, bearing at one end against the enlarged portion 27 and at the other end against a collar 29 held in position by a pin 30 extending through the shaft and protruding at both ends. The tendency of the spring is to push the shaft towards the right as viewed in Fig. II.

The outer end of the rock shaft is squared as indicated at 31, Fig. III, to receive a similarly shaped socket in an operating lever 32 provided with a handle 33. The shaft also has a threaded opening 34 to receive a short machine screw 35, the head of which bears upon the outer surface of the lever 32 and thereby securely locks the lever to the rock shaft. The contact surfaces of the lever and bearing enlargement 27 are V-shaped cams. Because of this structure the shaft 26 moves outwardly against the pressure of spring 28 whenever the lever 32 is moved either to the right or to the left, but when the operator releases his hold upon the handle 33, the spring 28 tends to draw the shaft 26 and lever 32 inwardly, but the latter in order to move inwardly swings back to neutral position because of the cam surfaces. The lever is provided with a pair of spaced side walls or abutments 36. Into the space between these abutments extends a fixed stop 37, triangular in cross section, which limits the movement of the lever in both directions. A pin 38 carried by the lever runs in a slot 39 formed in a laterally extending link 40, which may have connection with mechanism that it is desirable to operate simultaneously with the closing of the electric switch. By the arrangement shown it is possible to close the switch and at the same time to move the link 40 or not, just as the operator sees fit. A practical use for this device is illustrated in my co-pending application, Serial Number 288,570, filed April 8, 1919, where the link is shown connected with means for relieving compression in the cylinder of a gas engine.

When the armature 12 is raised by means of tilting the lever 33 in either direction, an electric circuit is completed through a coil of the electro magnet by means of contacts 13 and 17. The lines of force then generated by the magnet have a substantially closed path through core 10, shell 18, arms 23, armature 12 and nut 14 back to the core. Hence the armature is strongly held in raised position until the energization of the magnet falls below a certain predetermined value necessary to overcome the action of gravity upon the armature. Should the operator desire to open the switch before this condition is reached, he may do so by depressing a pin 41 which is slidably mounted in the central bore of the core 10. The first result of such depression is the storing up of energy in a coil spring 42, positioned within said bore between the pin 41 and rod 11. When this energy becomes greater than the force of attraction of the magnet the armature is suddenly depressed and the electric contacts separated quickly, thus avoiding unnecessary heating. A spring 9 tends to hold the pin 41 in elevated position.

Shell 18 may have a cover 43 secured thereon by means of screws 8. 44 is a flexible electric conductor attached to the armature 12 so as to move therewith, and connected with a line wire 45.

In the diagram of connections illustrated in Fig. I, the line wire 45 leads through a wire 46 to a battery 47 and a wire 48 connects the latter with an ampere-hour meter 49, from which a wire 50 leads to a motor-dynamo 51. From the motor-dynamo extends a wire 52, which is connected at its other end with a series coil 53 of the electro-magnet. The opposite end of this coil is attached to contact plate 17. The field coil 54 of the motor-dynamo is connected by means of wires 55 and 56 between one brush of the motor-dynamo and the contact plate 16. A lamp circuit 57 is connected across wires 45 and 50, to be fed either by the battery or the dynamo. Additional magnet coils 58 and 59, oppositely wound and in series with each other, are arranged in a shunt between wires 48 and the juncture of coil 53 with wire 52, the upper end of coil 58 being connected with wire 48 by means of a wire 60. From the juncture of coils 58 and 59, wire 61 extends to a contact upon the dial of the ampere-hour meter at the "battery full" position. This contact is adapted to be engaged by the electrically conductive meter-hand 63, which is connected at its pivot by a conductor 64 with the wire 48. Substantially this system of wiring is shown and fully described in my co-pending application above referred to.

Assuming that the battery needs charging, the operator moves the handle 33 in either direction, thus causing the armature 12 to move upwardly and the fingers 13 to engage the contact plates 16 and 17. Current then passes from the battery through wires 46, 45 and 44 to the armature 12, through the latter and resilient contacts 13 to contact plate 17, and thence through coil 53 and wire 52 to motor-generator 51, from the opposite brush of which it passes by means of wire 50, ampere-hour meter 49 and wire 48 back to the battery. At the same time a portion of the current passing through coil 53 flows through coils 59 and 58 and wires 60 and 48 back to the battery. Also, current passes from the battery through wires 46, 45 and 44, armature 12, resilient contacts 13, contact plate 16 and wire 56 through field coil 54, and thence through wires 55 and 50, ampere-hour meter 49 and wire 48 back to the battery. At this time the surge of current passing through coil 53 is very heavy, due to the fact that the motor must develop large torque in order to overcome the inertia of the engine flywheel. The magnetic effects of coils 53 and 59 are cumulative and opposed by that of coil 58, but owing to the heavy current through coil 53, the armature is strongly held in raised position. As the motor comes up to speed its load greatly decreases, and hence the current through coil 53 correspondingly decreases. If the engine fails to fire after the motor is fully up to speed, because of lack of fuel or ignition or other like reasons, the magnetic effect of coil 53 plus that of coil 59 will be insufficient to overcome the counteracting effect of coil 58 together with the action of gravity upon the armature, and the latter will fall, thus breaking the circuit and preventing the further discharge of the battery through the motor.

Under proper conditions, however, the engine will begin to fire and at once the electric machine 51 will become a generator and will begin charging the battery, current flowing from the generator 51 through wire 52, coil 53, contact plate 17, flexible contact 13, armature 12, wires 44, 45 and 46 to the battery, and thence through wire 48, ampere-hour meter 49, and wire 50 back to the generator. It should be noted that the direction of current through the coil 53 is therefore reversed. Current will also flow through coils 59 and 58, but in the same direction as before. The field coil 54 will be fed from the generator, flowing from the latter through wire 52, coil 53, contact plate 17, flexible contact 13, contact plate 16 and wire 56 to the field 54, and thence through wire 55 back to the generator. During this time, that is while the battery is being charged, the magnetic effect of coils 53 and 58 are cumulative and are opposed only by the effect of the small coil 59. Hence the electro-magnet is sufficiently energized to hold the armature 12 in raised position.

As the battery receives the charge, all of the current employed for the purpose passes through the ampere-hour meter, which registers the amount by the movement of the indicator hand 63. When the latter reaches the position indicating that the battery is completely charged, it touches contact 62 whereupon the coil 58 is short circuited. The energization of the electro-magnet is then too weak to enable the latter to support the armature, which falls, breaking the electric circuit between the battery and generator, and also breaking the generator field circuit.

I am aware that the particular embodiment of my invention above described, and illustrated in the accompanying drawings, is susceptible of considerable variation without departing from the spirit thereof, and therefore I desire to claim my invention broadly as well as specifically, as indicated by the appended claims.

I claim as my invention:

1. In combination, an electro-magnet having a vertical core and a magnetic shell engaging said core at the top and extending down along the sides of the magnet, an armature normally supported below said magnet, an electric circuit including a coil of said electro-magnet, a contact at the bottom of said magnet, a contact at the top of said armature, one of said contacts being resilient, and a source of electric current, said armature having parts adapted to engage the bottom of said core and said shell after said electric contacts complete said circuit.

2. In combination, an electro-magnet having a vertical core and a magnetic shell engaged with said core at the top and extending down along the sides of the magnet, an armature normally supported below said magnet, an electric circuit including a coil of said electro-magnet, a contact at the bottom of said magnet, a contact at the top of said armature, one of said contacts being resilient, and a source of electric current, said armature having parts adapted to engage the bottom of said core and said shell after said electric contacts complete said circuit, and mechanical means for raising said armature.

3. In combination, a vertically arranged electro-magnet, an armature supported below said magnet, and mechanical means for raising said armature including a horizontally mounted rock shaft provided with an operating handle, a bearing for said shaft, co-acting cam surfaces upon said bearing and handle, and a spring tending to move said rock shaft longitudinally, said cam surfaces causing the rotation of said rock shaft to neutral position during the longitudinal movement.

4. In combination, a vertically arranged electro-magnet, an armature supported beneath said magnet, and mechanical means for raising said armature including a horizontally mounted rock shaft provided with oppositely extending lifting fingers, and an operating handle whereby rotation of said shaft in either direction will raise said armature, a bearing for said shaft, co-acting cam surfaces upon said bearing and handle, and a spring tending to move said shaft longitudinally, said cam surfaces causing rotation of said shaft to neutral position during the longitudinal movement thereof.

5. In combination, a vertically arranged electro-magnet, an armature supported beneath said magnet, mechanical means for raising said armature including a horizontally mounted rock shaft provided with oppositely extending lifting fingers, whereby rotation of said shaft in either direction will raise said armature, means for actuating said shaft and means for automatically returning said shaft to neutral position when said actuating means is released.

6. In combination, a vertically arranged electro-magnet, an armature supported beneath said magnet, mechanical means for raising said armature including a horizontally mounted rock shaft, actuating means for said rock shaft, means for automatically returning said shaft to neutral position when said actuating means is released, said electro-magnet when energized being adapted to hold said armature in raised position, and means independent of said rock shaft for depressing said armature.

7. In combination, an electro-magnet having a vertically arranged core, an armature supported beneath said core, mechanical means for raising said armature including a horizontally mounted rock shaft, actuating means for said rock shaft, means for automatically returning said rock shaft to neutral position when said actuating means is released, said electro-magnet when energized being adapted to hold said armature in raised position, and means independent of said rock shaft and extending through said core for depressing said armature.

8. In combination, an electro-magnet having a vertically arranged core, said core having a longitudinal bore extending entirely therethrough, an armature supported beneath said core and carrying a pin extending upwardly into said bore, mechanical means for raising said armature including a horizontally mounted rock shaft, actuating means for said rock shaft, an electric circuit including a coil of said magnet, a source of current supply, and contacts oppositely positioned on said magnet and armature, said electro-magnet being adapted to hold said armature in raised position when said electric circuit is closed through said contacts, a coil spring in said bore above said pin and a second pin slidable in said bore above said spring and protruding above the upper end of said core.

9. In combination, a vertically arranged electro-magnet, an armature supported beneath said magnet, mechanical means for raising said armature including a horizontally mounted rock shaft provided with oppositely extending lifting fingers and an operating handle, whereby rotation of said handle in either direction will raise said armature, spaced abutments carried by said handle, a support for said shaft, and a lug fixed in said support and extending into the space between said abutments in order to limit the throw of the handle in either direction.

10. In an electromagnet the combination of a magnetizing coil having a core; an armature adapted to be held in attracted position by the core when magnetized by the coil; electric circuit contacts secured to the armature; corresponding circuit contacts secured to the coil; means for bringing said contacts into contacting relationship; and separate means for disconnecting said contacts, said disconnecting means including yieldable power accumulating mechanism.

11. In an electromagnet the combination of a magnetizing coil having a core; an armature adapted to be held in attracted position by the core when magnetized by the coil; electric circuit contacts secured to the armature; corresponding circuit contacts secured to the coil; means for bringing said contacts into contacting relationship; and a plurality of means for disconnecting said contacts, one of said disconnecting means being normally operable at a higher rate of speed than the other.

In testimony whereof, I affix my signature.

CARL P. BROCKWAY.